May 6, 1958  J. E. HOGAN  2,833,580
AIRCRAFT DOOR LOCK

Filed Aug. 22, 1955  4 Sheets-Sheet 1

INVENTOR
John E. Hogan
Herbert E. Metcalf
His Patent Attorney

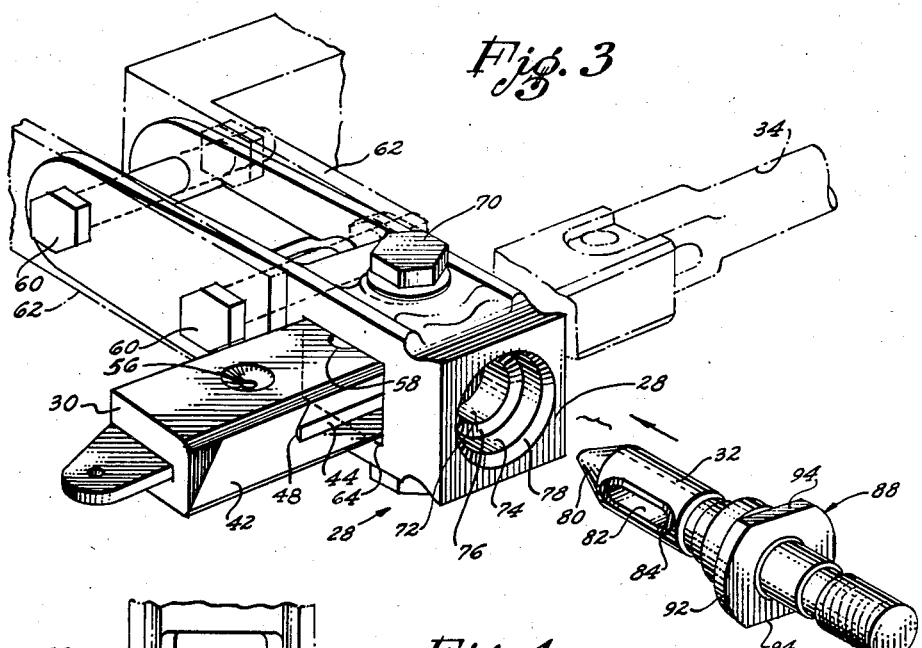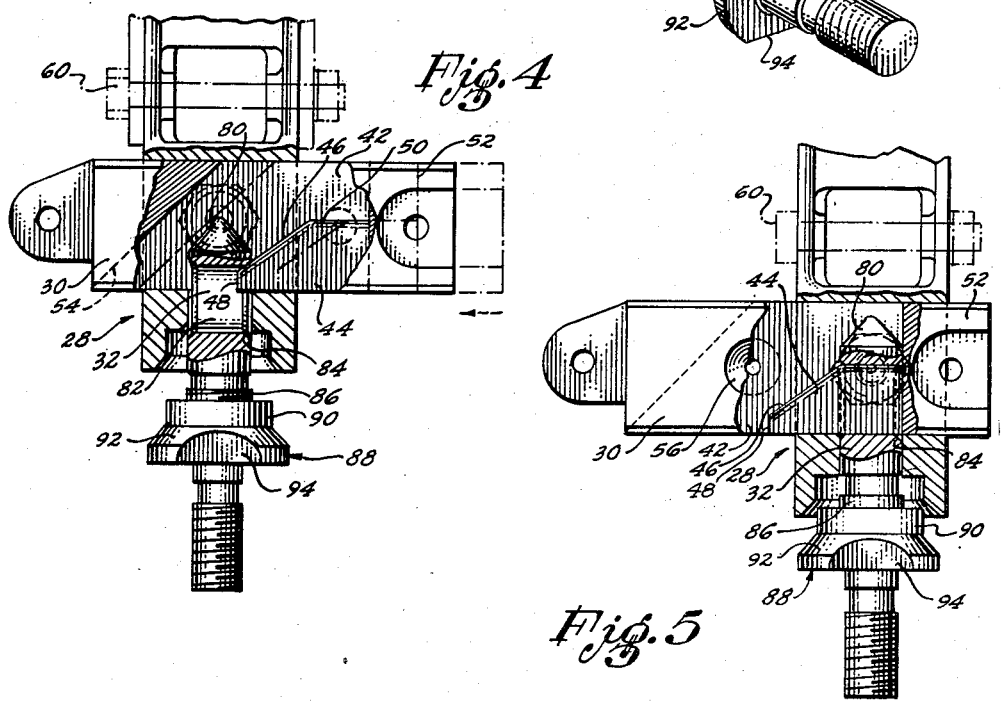

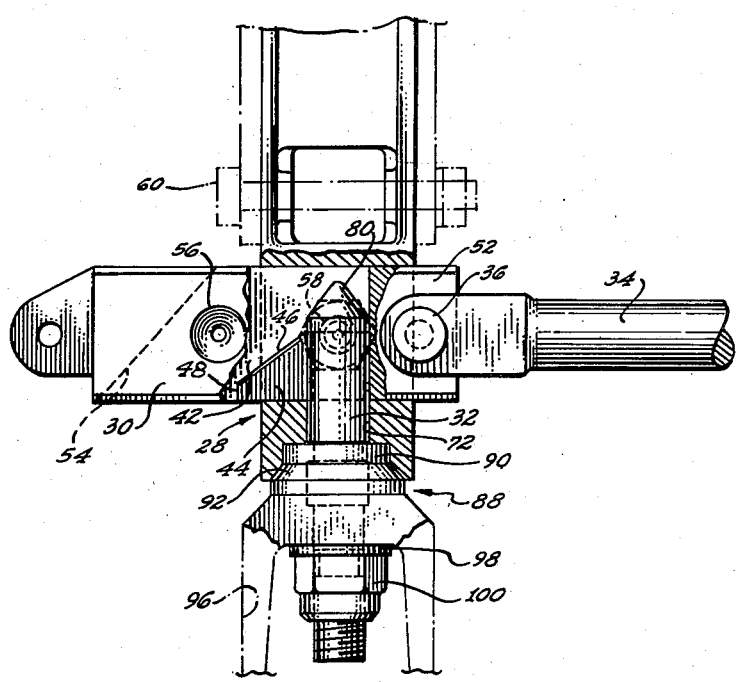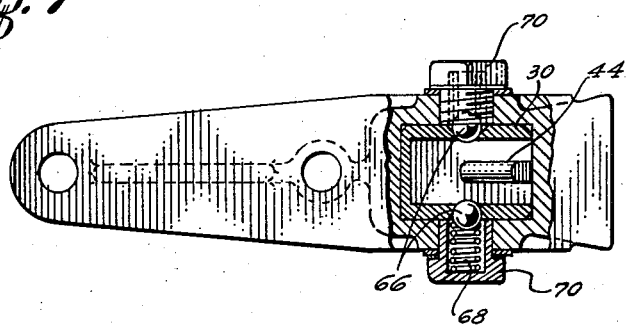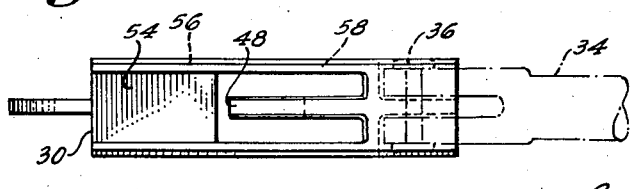

May 6, 1958

J. E. HOGAN 2,833,580

AIRCRAFT DOOR LOCK

Filed Aug. 22, 1955

INVENTOR
John E. Hogan

His Patent Attorney

United States Patent Office 2,833,580
Patented May 6, 1958

2,833,580
AIRCRAFT DOOR LOCK

John E. Hogan, Los Angeles, Calif., assignor to Northrop Aircraft, Inc., Hawthorne, Calif., a corporation of California Application August 22, 1955, Serial No. 529,662

1 Claim. (Cl. 292—302)

This invention relates to latches, and, more particularly, to a door latch especially suited for locking external doors or panels in a closed position on the surface of an airplane.

The instant invention is considered to be an improvement on the device bearing Patent No. 2,661,975 issued December 8, 1953 to Harold E. Michael and assigned to Northrop Aircraft, Inc.

The requirements for a suitable aircraft door lock differ substantially from those of ordinary locks and latches in common use elsewhere. Speed and accuracy of operation, resistance to loads from many directions, and positive locking action during normal vibration and operating conditions are the main requirements to be satisfied.

Accordingly, the objects of the present invention include providing an aircraft door lock which will always be aligned or will align itself with the mating door parts to assure closing in the proper position, providing a lock which will pull the door in place against pressure of sealing strips and the like, and which will positively separate the door from its mating structure when unlocked, providing a lock which will carry loads from all directions, which will have no load which tends to provide an unlocking force, and which may be easily operated in gangs of two or more from a remote position.

Another object of this invention is to provide an aircraft door lock that has component parts therein that will permit manufacturing of the various structures with a greater tolerance, provide for an adjustment for wearing which might occur on applications where there is a high vibration factor, and at the same time resist extremely great compression, tension and shear loads.

Some aircraft doors and panels are relatively bulky, large, and have various shapes and contours, so that two men are sometimes needed to properly engage the door in its closed position, e. g., one to hold the door closed or nearly closed while the other performs the locking operation.

It is, therefore, a further object of this invention to provide an aircraft door lock having a prelatching position to hold the door in place until the final lock is accomplished.

Other objects and features of advantage will be noted in the description of specific apparatus forming a part of this specification, to follow.

Briefly, the present invention comprises a lock member having a bolt slidable therethrough, these two parts preferably mounted on the hinged door. A striker, mounted on the closure structure around the door, enters the lock perpendicularly to the path of the bolt. Locking is accomplished by a tongue within the bolt which engages a slot through the striker. The tongue is beveled on two sides to provide a sliding lever action when locking the door and to accomplish a prelatching action, in combination with a spring-loaded link attached to the bolt, to return it to a partially locked position when the striker enters the bolt a given distance. The bolt includes a cam surface to engage the end of the striker to force it from the bolt during the unlocking operation. Each lock assembly is normally held in both a locked and a prelatched position by two springs, balls, and ball detents. When locked, the loads on the tongue and striker are purely in shearing directions, thus precluding any force which tends to open the lock.

My invention may be more readily understood by reference to the accompanying drawings, shown by way of illustration and not limitation, wherein:

Figure 3 is a perspective exploded view showing, on a larger scale than Figure 2, the lock, striker and bolt arrangement.

Figure 4 is a fragmentary view of the bolt and the striker, showing a prelatched position of the bolt.

Figure 5 is a view similar to Figure 4 but showing the bolt and striker in the latched position.

Figure 6 is also a view similar to Figure 4 but showing structure to which the striker is secured for mounting on an aircraft and also showing structure to which the bolt is attached for moving the latter to and from the various latching and unlatching positions.

Figure 7 is a fragmentary, cross-sectional view illustrating the manner in which the spring-loaded ball detents engage the bolt.

Figure 8 is a top view of the bolt.

Figure 1:
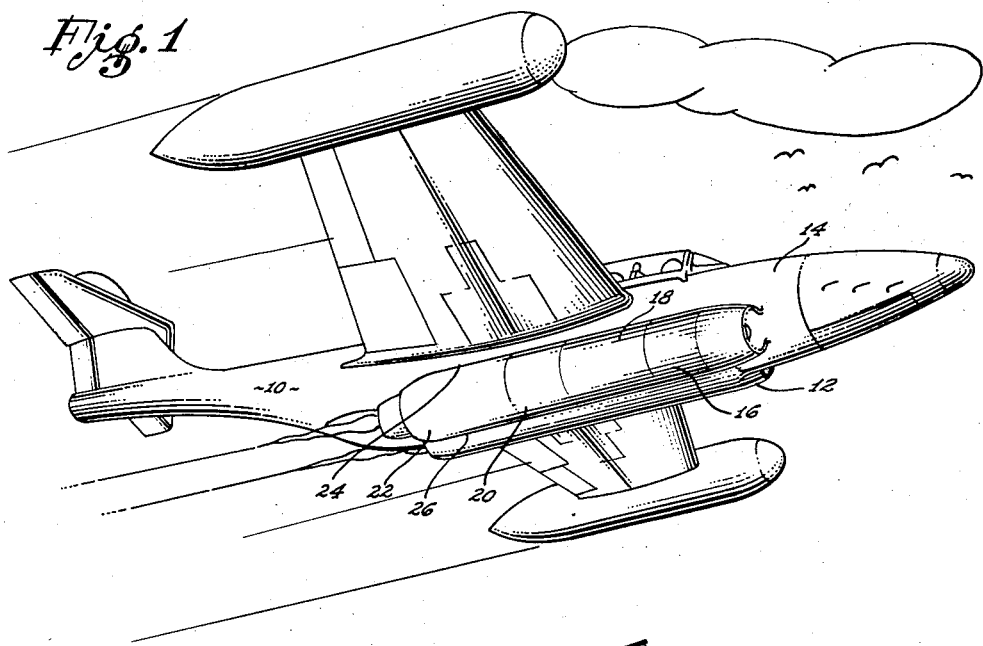
Figure 1 is a perspective view showing an airplane using engine nacelle doors having locks made according to the present invention.

Referring to the various figures for a detailed description of a preferred embodiment of this invention, an airplane 10 has engine nacelles 12 on each side of the fuselage 14 equipped with quickly removable nacelle doors 16, 18, 20, and 22. The doors swing about an upper hinge line 24 and are locked closed against an intervening fuselage section providing a lower edge 26 near the bottom center line of the fuselage.

Figure 2:
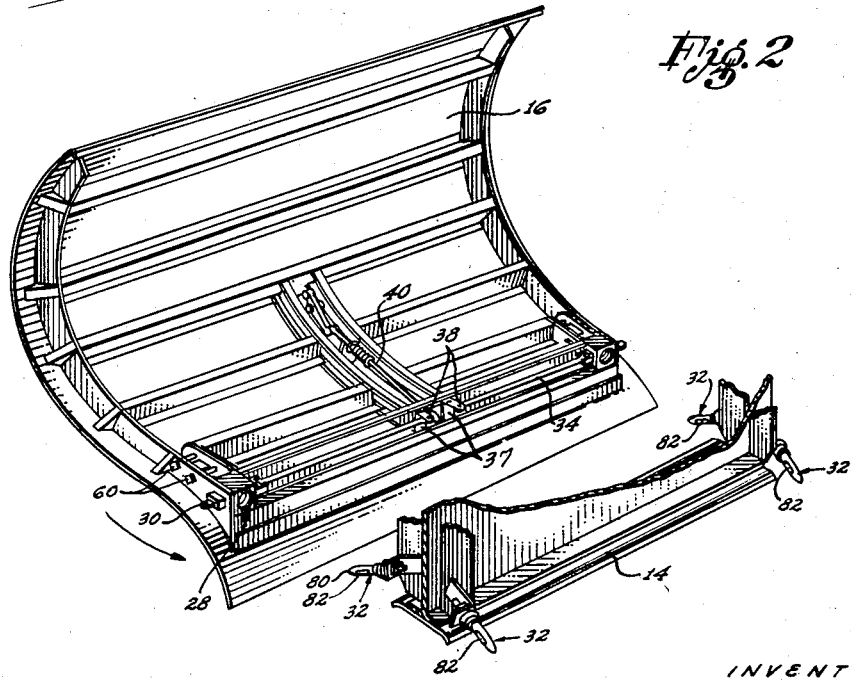
Figure 2 is a perspective view showing the right-hand front nacelle door in a slightly open position, as viewed from ahead of and above the door.

The forward right-hand door 16 is further shown in Figure 2, as viewed from within the nacelle looking aft and outwardly at the inner side of the door. At each end of the door 16, a lock member 28 is fixed to the door, and a bolt 30 is slidable fore-and-aft within the lock 28. Attached to the fuselage 14 are two strikers 32 positioned to enter the locks 28 when the door is closed and be engaged by the bolts 30 when the door is locked.

An adjustable actuating rod 34 is connected to the inner end of each bolt 28, as by rivet 36, these rods 34 in turn being connected respectively to two bell cranks 37 which are pivotally connected to the door 16 at crank pivots 38. The bell cranks 37 are mutually connected to an opening rod 40 movable crosswise of the door 16. It is thus seen that when the operating rod 40 is pulled outwardly from the fuselage 14, the bell cranks 36 and actuating rods 34 operate to pull both bolts 30 toward the center of the door. This releases the door from its locked position as will be further described herein.

As shown in Figures 3 and 4, each bolt 30 is rectangular in form with a vacant central portion 42 into which the striker 32 will extend. A tongue 44 is formed within the bolt, the tongue pointing toward the adjoining end of the door 16 and having a relatively long bevel 46 and a blunt tip 48 intersecting at the tip of the tongue. The tongue 44 near its supported end has a straight portion 50 parallel to the sides of the bolt 30. The tongue 44 bisects the vacant portion 42 and is connected to the bolt 30 only at the base 52. The base 52 of the tongue and a slanting cam surface 54 form partitions from side to side of the bolt 30. The slanting cam surface 54, at the end of the vacant portion 42, extends approximately parallel to the lower bevel 46.

Two ball detents 56 and 58 are located in a fore-and-aft line in each exterior side of the bolt 30, each detent on one side being exactly opposite a detent on the other side. These detents aid in establishing prelatched and locked positions of the door, and will be referred to later.

The lock 28 (Figures 2 and 3) is fixed to the door 16 by means of two mounting bolts 60 in sheet metal brackets 62 fixed to the door, and contains a rectangular opening 64 through which the bolt 30 slides. On opposite sides of the opening 64, and adjacent to the path of the ball detents 56 and 58 of the bolt 30, two threaded holes are provided in the lock 28, and a steel ball 66, spring 68, and retainer 70 are installed in these holes to press the balls against the sides of the bolt 30 and into the detents.

Formed in the end of lock 28 facing the striker 32 on the fuselage 14 is a receiving bore 72 having a uniform diameter. Adjacent the receiving bore 72 is a larger opening 74 also having a uniform diameter throughout. Due to the fact that opening 74 is larger than the bore 72 there is a shoulder 76 formed between the two openings. The opening 74 has adjacent thereto and formed in the lock a tapered mouth entrance 78. The receiving bore 72 mates with the striker 32 as the door is being closed.

As further shown in Figures 2 and 4, each striker 32 carries a tapered nose 80 which first contacts the entrance 78, thus assuring alignment of the locking parts each time the door 16 is closed, by positioning the door to an exact location in a plane normal to the striker center-line. Thus, any play at the door hinge line 24 or swaying of the open edge of the relatively large door 16, will not inhibit proper mating of the locking parts whenever the door is pushed closed. Although the receiving bore 72, opening 74, entrance 78, tapered nose 80 and striker 32 are shown as having a circular cross section, these parts may obviously be made with a square or rectangular cross section, if desired. A slot 82 through the striker 32 accommodates the tongue 44 of the bolt 30 as the latter moves into locking position. Chamfered edges 84 on the slot 82 present a larger bearing surface to the bevel 46 of the tongue 44 than if the edges were left sharp.

The striker 32 is externally threaded at 86 to receive an internally threaded nut-like member 88. Member 88 comprises a ring 90 that is complementary in configuration to and is received in opening 74 when the bolt and striker are in the latched position. As a part of member 88 there is integral with ring 90 another ring 92 having a bevel thereon that is complementary to and received in the tapered mouth 78. There are flats 94 on ring 92 for rotating member 88 on striker 32.

The virtues of the configuration of member 88 coupled with the configuration of the opening 74 and mouth 78 is that great shear loads may be supported by the door latch. It has been determined through tests that the instant door lock will withstand a tension load of approximately 12,000 pounds, a compression load of approximately 17,000 pounds, and shear load of approximately 9,000 pounds.

When locked, the loads on the tongue 44 and striker 32 are purely in shearing directions as previously stated. As a result it is important that the door lock 28 be capable of withstanding such shear loads as may be applied.

Additionally, the member 88 may be adjusted on striker 32 to permit greater tolerance in the manufacturing of the tongue 44 and other component parts. Further, the member 88 also provides for adjustment for wearing which may occur on applications where there is a high vibration factor.

Slidable on striker 32 is a yoke 96 that has for its purpose the securing of the striker to the fuselage 14. The yoke 96 is retained on the striker 32 by washer 98 and nut 100.

Figure 9:
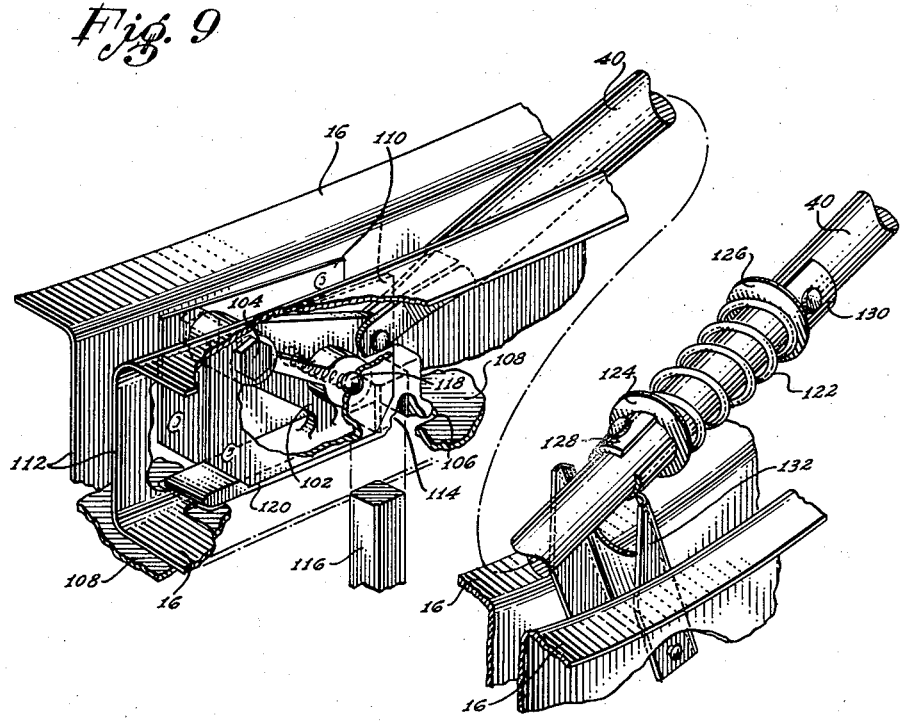
Figure 9 is an enlarged detail view, partly cut away, showing a lock operating means and prelatching spring.

A suitable operating mechanism for these door locks is shown in Figures 2 and 9. The operating rod 40 is rotatably connected to a handle socket member 102 pivotally mounted on an axis bolt 104 just inside a cut-out 106 in the outer skin 108 of the door 16. Socket member 102 is mounted between two side plates 110 riveted to channel sections 112 forming a part of the door structure, to strengthen the installation. A recess 114 is provided in the outer side or bottom of the handle socket member 102 whereby a lever 116 or the like may be inserted to rotate the socket member 102 and control the operating rod 40. The socket member 102 is held in the "door locked" position with small spring-loaded balls 118 and detents between the socket and side plates 110 similar to the ball and detent means between the bolt 30 and lock 28. The socket member 102 in this specific embodiment is a casting having a thin outer element 120 integral therewith for manually pushing inwardly to unlock the door.

Between the locked and completely unlocked positions of the linkage components heretofore described, a prelatched position is provided, and a latching spring 122 on the operating rod 40 returns the linkage to the prelatched position from the unlocked position. The latching spring 122 is mounted between two slidable washers 124 and 126 which bear against two collars 128 and 130 on the respective outer sides thereof. Collars 128 and 130 are secured to operating rod 40. When the rod 40 is pulled to the unlocked position, one washer 124 bears against a spring stop 132 attached to the door 16 while its receptive collar 128 passes on through the stop 132, thus compressing the spring 122. When the operating rod 40 is then released, the latching spring 122 urges the linkage members and the bolt 30 back to the prelatched position as determined by the spring location.

At each of the bolts 30, the first detents 56 are occupied by the balls 66 at the prelatched position, thus affording additional means for properly determining this position. The second detents 58 in the bolt 30 are occupied by the balls 66 at the locked position, simultaneously with the ball and detent assembly at the handle socket member 102.

In any bolt position, the upper edge of the tongue 44, which is flush with the top of the bolt 30, can bear against the outer side of the rectangular opening 64 in the lock 28 and thus transmit door loads directly to the lock 28, so that the tongue 44 may not be required to take excessive bending loads. Since the striker 32 is also surrounded by the lock bore 72, it is easily seen that the present lock holds the door fixed against all loads in every direction, particularly shear loads. Because of the parallel portion 50 on the tongue 44, on which the striker 32 bears when locked, no load components act in a direction to unlock the door.

To unlock and open the door, the bolt 30 is withdrawn from the striker 32 by rotating the handle socket member 102, and in the event of the door tending to stick closed, the cam surface 54 bears against the end of the striker nose 80 to force separation of the parts and opening of the door 16.

As shown herein, the door 16 has two locks, both operable by a single handle or lever. However, it is obvious that a single lock can similarly be operated, or that three or more locks can also be gang-operated by adding other actuating rods. For ease of operation and protection of moving parts, the bolt 30 and the projecting end portion of the striker 32 are preferably given a graphite coating to reduce the sliding friction.

Thus, it is seen that the door locking device of the present invention is very easily, simply, and quickly operated, which makes it especially suitable for aircraft installations requiring a minimum of maintenance time.

It is also inherently accurate in its locating and locking positions, and is durable from the standpoint of wear and load-bearing strength.

From the above description it will be apparent that there is thus provided a device of the character described possessing the particular features of advantage before enumerated as desirable, but which obviously is susceptible of modification in its form, proportions, detail construction and arrangement of parts without departing from the principal involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claim.

What is claimed is:

A lock for fastening two parts together comprising a receiving member attached to one of said parts and having a receiving passage axially facing the other of said parts; said passage being a pair of concentric openings having a shoulder therebetween; a bolt member slidable through said receiving member in a direction perpendicular to the central axis of said passage; a striker member fixed to said other part opposite said receiving member and having thereon structure that is complementary to the configuration of said passage and is adapted to project into said passage when said parts are brought together; said striker having an elongated hole extending therethrough parallel to the sliding direction of said bolt in said receiving member; a tongue movable with said bolt located to enter and fill said elongated hole when said striker has entered said receiving member, to thus determine a locked position; operating means connected to slide said bolt to and from said locked position; a first sloping side on said tongue positioned to contact the outermost end of said elongated hole remote from said other part as said bolt is being moved toward said locked position, to pull said parts together by sliding cam action of said first sloping side against said elongated hole end; a second sloping side on said tongue intersecting said first sloping side at the tip of said tongue; said striker having a tapered nose positioned to guide said receiving member into alignment around said striker from off-center positions during closure of said parts; said second sloping side having a predetermined angle to meet said tapered nose along a sloping surface intersection; said bolt and tongue having a prelatched position where said tongue tip lies in interference with said tapered nose when said parts are being closed; and elastic means connected to urge said bolt and tongue to said prelatched position from an unlocked position where said tongue and striker do not interfere in passing, whereby said interference during preliminary closure causes said tongue to move against said elastic means until said tongue tip is opposite said elongated hole and then said tongue tip will engage in said elongated hole in said prelatched position to hold said parts adjacent prior to locking by said sliding cam action.

References Cited in the file of this patent

UNITED STATES PATENTS

| 1,214,687 | Klein et al. | Feb. 6, 1917 |
| 2,265,691 | Hogg | Dec. 9, 1941 |
| 2,661,975 | Michael | Dec. 8, 1953 |